United States Patent [19]

Nunokawa

[11] Patent Number: 5,189,669

[45] Date of Patent: Feb. 23, 1993

[54] CELL TRANSFER APPARATUS AND METHOD USING A VARIABLE RATE CODEC

[75] Inventor: Masakatsu Nunokawa, Fujimi, Japan

[73] Assignee: Kabushiki Kaisha Toshiba, Kawasaki, Japan

[21] Appl. No.: 581,389

[22] Filed: Sep. 12, 1990

[30] Foreign Application Priority Data

Sep. 14, 1989 [JP] Japan .................. 1-239671

[51] Int. Cl.⁵ .................................................. H04J 3/22
[52] U.S. Cl. .......................................... 370/84; 370/60
[58] Field of Search ............... 370/60, 110.1, 84, 82, 370/83, 99, 58.1, 43, 94, 1, 112, 109; 358/426, 261.3, 261.2, 432, 261.1, 136, 11, 135, 133; 341/107, 51, 63, 51, 57, 60, 87; 381/31, 30, 29; 375/122; 382/56

[56] References Cited

U.S. PATENT DOCUMENTS

| | | | |
|---|---|---|---|
| 4,763,322 | 8/1988 | Eizenhofer | 370/84 |
| 4,800,441 | 1/1989 | Sato | 358/426 |
| 4,809,081 | 2/1989 | Linehan | 358/261.3 |
| 4,819,079 | 4/1989 | Takao | 358/426 |
| 4,891,643 | 1/1990 | Mitchell et al. | 358/426 |
| 4,991,173 | 2/1991 | Krisher | 370/84 |

FOREIGN PATENT DOCUMENTS

0234859  9/1987  European Pat. Off. .

OTHER PUBLICATIONS

Takeuchi et al., "Synchronous Composite Packet Switching-A Switching Architecture For Broadband ISDN," *IEEE Journal On Selected Areas In Communication*, vol. SAC-5, No. 8, Oct. 1987, pp. 1365-1376.

R. Cox et al., "Multiple User Variable Rate Coding For TASI And Packet Transmission Systems," *IEEE Transactions On Communications*, vol. COM-28, No. 3, Mar. 1980, pp. 334-344.

*Primary Examiner*—Benedict V. Safourek
*Assistant Examiner*—Dang Ton
*Attorney, Agent, or Firm*—Finnegan, Henderson, Farabow, Garrett and Dunner

[57] ABSTRACT

A cell transfer apparatus and method using a variable rate codec wherein a sequence number of each cell is determined by adding a weight corresponding to an encoding time of information. In a transmitting side, each of encoded pieces of information is cellulated to a predetermined length cell for each information having a length of integer times a predetermined unit length of information. A sequence number of a next cell is determined by adding as a weight the number of pieces of information having a unit length included in the last cell to a sequence number of a last cell, and is sent as being added to each cell. In a receiving side, reproduction timing numbers comprising serial numbers are sequentially generated at timings synchronous with the unit length of the pieces of information and compared with the sequence number added to each cell. When the both coincide, the information of that cell is decoded.

16 Claims, 10 Drawing Sheets

CELL HEADER PART 10    CELL INFORMATION PART 20 b --- OTHER HEADER ELEMENT

SN --- SEQUENCE NUMBER

I --- VOICE INFORMATION PART

CELL TRANSFER APPARATUS AND METHOD USING A VARIABLE RATE CODEC

BACKGROUND OF THE INVENTION

1. Field of the Invention

The present invention relates to cell transfer apparatus and methods using a variable rate codec and more particularly to a cell transfer apparatus and method which determines a sequence number of each cell by adding a weight-corresponding to a time required for encoding data.

2. Description of the Related Art

For example, a voice waveform which is data to be transferred is encoded in units of a given time $t_1$ length and the encoded data is sequentially cellulated and sent. The cellulated data is cyclically allocated sequence numbers. When the voice waveform is detected as being silent, it is not encoded, but the sequence number is incremented. FIG. 10 shows one example of cellulated data to be sent. The data includes a cell header part 10 and a cell information part 20. The cell header part includes a portion which in turn includes a sequence number SN and the remaining portion which includes another header element b while the cell information part 20 includes encoded voice information I.

The sent cell is delayed by a predetermined time $d_1$ in a network and then received. It is then subjected to fluctuation absorption delay by $d_2$ to absorb a fluctuating delay, reproduced and then decoded. Reproduction of the cell which has been buffered received is performed at the same time interval $t_1$ as the cell transmission. A sequence number SN allocated to each cell is compared with a reproduction timing number TN. If a cell is not present at that timing, either predetermined interpolation is made or it is processed as being sound-absent or silent.

Recently, a cell transfer system using a variable rate codec is proposed in which information is encoded at a variable rate by the variable rate codec, cellulated to packets of a predetermined length and transferred in an asynchronous manner. However, since each cell is transferred in the asynchronous manner in the cell transfer system using the variable rate codec, there has been a problem that the above-mentioned conventional cell transfer method cannot be applicable for the cell transfer system using the variable rate codec.

SUMMARY OF THE INVENTION

It is an object of the present invention to provide a cell transfer system which is also applicable to a cell transfer system using a variable rate codec.

In order to achieve the above object, the present invention provides a cell transfer method using a variable rate codec in which information is encoded at a variable rate by the variable rate codec, and the encoded information is cellulated to packets having a predetermined length and transferred in an asynchronous manner, comprising the steps of: determining a sequence number for each cell by adding a weight corresponding to an encoding time of the encoded information when the cellulated information is to be sent; and determining a reproduction timing in accordance with the sequence number of a received cell when the received cellulated information is to be reproduced. Thus the reproduction side is able to reproduce information without recognizing a decoding time.

DESCRIPTION OF THE PREFERRED EMBODIMENTS

Figure 1:
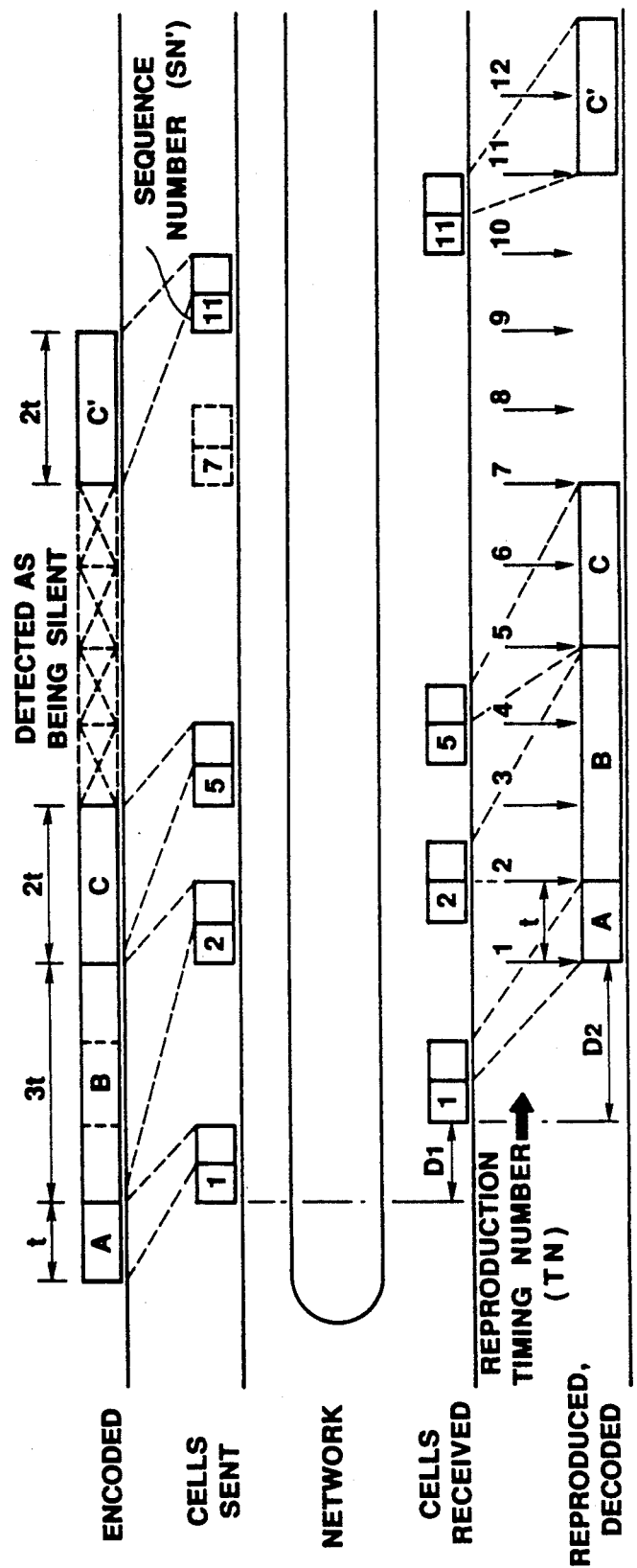
FIG. 1 is a timing chart indicative of the operation of one embodiment of the present invention.

FIG. 1 shows an embodiment of cell transfer to which is applied a cell transfer system using a variable rate codec according to the present invention. In this embodiment, transmission is carried out by encoding information at a different rate depending on the kind of information to be transmitted. The reason why such system is used is to increase a compression rate of information as a whole by encoding information at a low compression or encoding rate when the information is of high density and at a higher compression or encoding rate when the information is of lower density.

In FIG. 1, an encoded frame designated A is, for example, an encoded modem signal. In this case, the frame is encoded in the minimum unit encoding time t. An encoded frame designated B is, for example, encoded ambient noise used for interpolation. In this case, the noise is encoded in an encoding time 3t which is three times the minimum unit encoding time t. An encoded frame designated C is, for example, encoded voice information. In this case, the information is encoded in an encoding time 2t which is twice the minimum unit encoding time t.

Pieces of information encoded thus at different rates are cellulated into packets of a predetermined length and sent. A sequence number set of each cell is given a weight corresponding to the encoding time of each cell information.

First, a sequence number is set as "1" for the leading cant information portion in cell transmission. In FIG. 1, when the encoded frame A is cellulated and sent, this cell is allocated the sequence number "1".

In the cellulation of the encoded frame B occurring next, the sequence number of the cell corresponding to the encoded frame B is determined by adding a weight corresponding to the encoding time of the encoded frame A occurred last. Since in this case the encoding time of the encoded frame A is the minimum unit encoding time t, the sum "2" of the weighting number "1" and the last sequence number "1" is set as a sequence number of the cell corresponding to the encoded frame B.

In the cellulation of the encoded frame C occurring next, since the encoding time of the encoded frame B occurred last is 3t, the sum "5" of a weighting number "3" and the last sequence number "2" is set as a sequence number of the cell corresponding Lo the encoded frame C.

There is a silent portion having a time of 4t following the encoded frame C. Since it is necessary to ensure a time for the silent portion in the reproduction, the sequence number is incremented although a cell for the silent portion is not sent. Namely, since the encoding time of the encoded frame C occurred last is 2t, the sum "7" of the weighting number "2" and the last sequence number "5" is set as a sequence number of the silent portion when same is detected.

Also, the sequence number of significant information occurring next to the silent portion is also determined in accordance with rules similar to those mentioned above. In this embodiment, if an encoded frame C' following the silent portion is not the head of new significant information, the sequence number of a cell corresponding to the encoded frame C' is set as "11" which is the sum of a weighting number "4" corresponding to the encoding time 4t of the silent portion and the last sequence number "7" of the silent portion.

Each cell sent by a transmitting side is delayed by a time $D_1$ in a network and then the delayed cell is received by a receiving side. In the receiving side, the received cell is further subjected to a fluctuation absorption delay by a time $D_2$ to absorb a fluctuating delay caused by the network for reproducing and decoding the cell. The reproduction of the cell buffered by the receiving side is performed synchronously with the minimum unit encoding time t of the transmitting side in accordance with the sequence number given to each cell. The receiving side generates a reproduction timing number TN which is incremented sequentially in units of the minimum unit encoding time t after the fluctuation absorption delay $D_2$ has passed. The sequence number of each cell is compared with the reproduction timing number TN. The cell is reproduced at the timing when the sequence number of that cell coincides with the reproduction timing number TN. Namely, in FIG. 1, the first cell with the sequence number "1" is reproduced at the timing when the reproduction timing number TN is "1", the second cell with the sequence number "2" is reproduced at the timing when the reproduction timing number TN is "2", the third cell with the sequence number "5" is reproduced at the timing when the reproduction timing number TN is "5", and the fourth cell with the sequence number "11" is reproduced when the reproduction timing number TN is "11".

Figure 2:
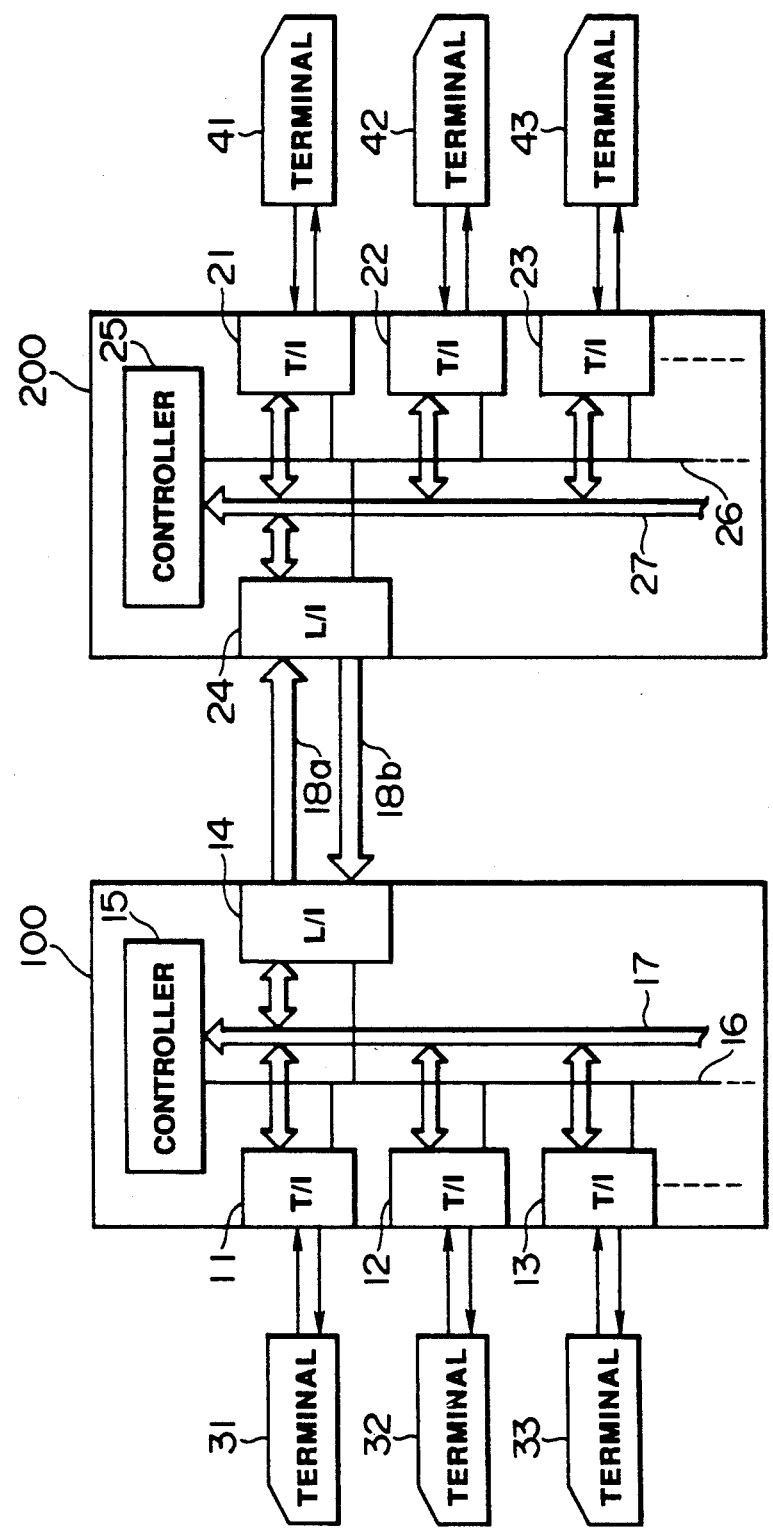
FIG. 2 is a block diagram of a packet communication system to which the embodiment is applied.

FIG. 2 shows an example of the structure of a packet switching system to which the present invention is applied.

In FIG. 2, a packet switching system 100 includes terminal interfaces 11, 12 and 13, a line interface 14, a controller 15, a control bus 16, and a high speed bus 17. Similarly, a packet switching system 200 includes terminal interfaces 21, 22 and 23, a line interface 24, a controller 25, a control bus 26, and a high speed bus 27. The packet switching systems 100 and 200 are interconnected by lines 18a and 18b. The system 100 is connected with terminals 31, 32 and 33 through the terminal interfaces 11, 12 and 13 while the system 200 is connected with terminals 41, 42 and 43 through the terminal interfaces 21, 22 and 23.

Figure 3:
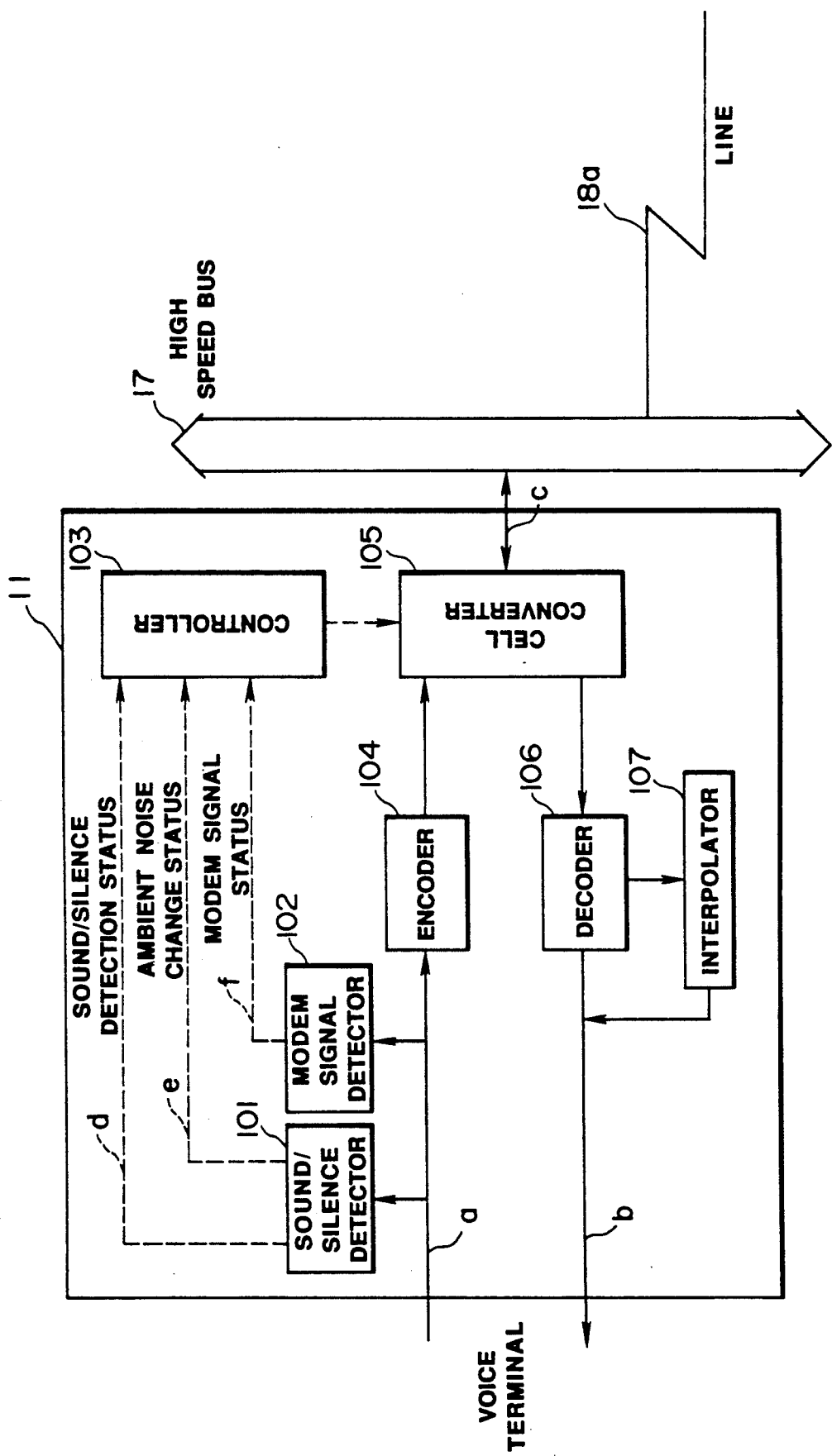
FIG. 3 is a detailed block diagram of a terminal interface of FIG. 2.

FIG. 3 shows the detailed structure of the terminal interface 11. In FIG. 3, the interface 11 is connected with the terminal 31 which is, for example, a voice terminal through a receiving line a and a transmitting line b and also connected with the high speed bus 17 through a signal line c.

The terminal interface 11 includes a sound/silence detector 101, a modem signal detector 102, a controller 103, an encoder 104, a cell converter 105, a decoder 106, and an interpolator 107. The encoder 104 and the decoder 106 constitute a variable rate codec. The other terminals 12, 13, 21, 22 and 23 have the similar structures.

A cell sending operation which cellulates and sends voice information from the terminal 31 will be described with respect to FIG. 3. The voice information from the terminal 31 appears on the receiving line a. The sound/silence detector 101 monitors the voice information on the receiving line a. If the voice information on the line a is silent, the detector 101 reports this fact to the controller 103 by the sound/silence detection status on a line d. Thus, the controller 103 controls the cell converter 105 so as to stop the transmission of a cell by the cell converter 105

The sound/silence detector 101 sends to the controller 103 a signal of ambient noise change status e indicative of a change in the ambient noise level. Thus, the controller 103 controls the cell converter 105 to thereby control the cellulation and transmission of ambient noise. The ambient noise is used when a silent portion is interpolated in the reproduction side.

The modem signal detector 102 detects a modem signal from voice information on the receiving line a and sends this signal as a modem signal status f to the controller 103. The controller then controls the cell converter 105 so as to control the cellulation and transmission of the modem signal.

The voice information on the receiving line a is input to the encoder 104 which encodes the voice information, the ambient noise and the modem signal in accordance with their kinds at the corresponding different rates. The encoded information from the encoder 104 is cellulated by the cell converter 105 under the control of the controller 103 and the resulting cell is sent through the signal line c onto the high speed bus 17 and through the line interface 14 onto the line 18a.

Cell reception will be described next with reference to FIG. 3. The cell on the high speed bus 17 is input through the signal line c to the cell converter 105 in which the cell is subjected to order control, etc., and then sent to the decoder 106 for decoding purposes A silent portion is interpolated by the interpolator 107 on the basis of information on the ambient noise, etc., sent from the transmitting side. The information decoded and interpolated by the decoder 106 and the interpolator 107, respectively, are sent through the transmitting line b to the terminal 31.

Figure 4:
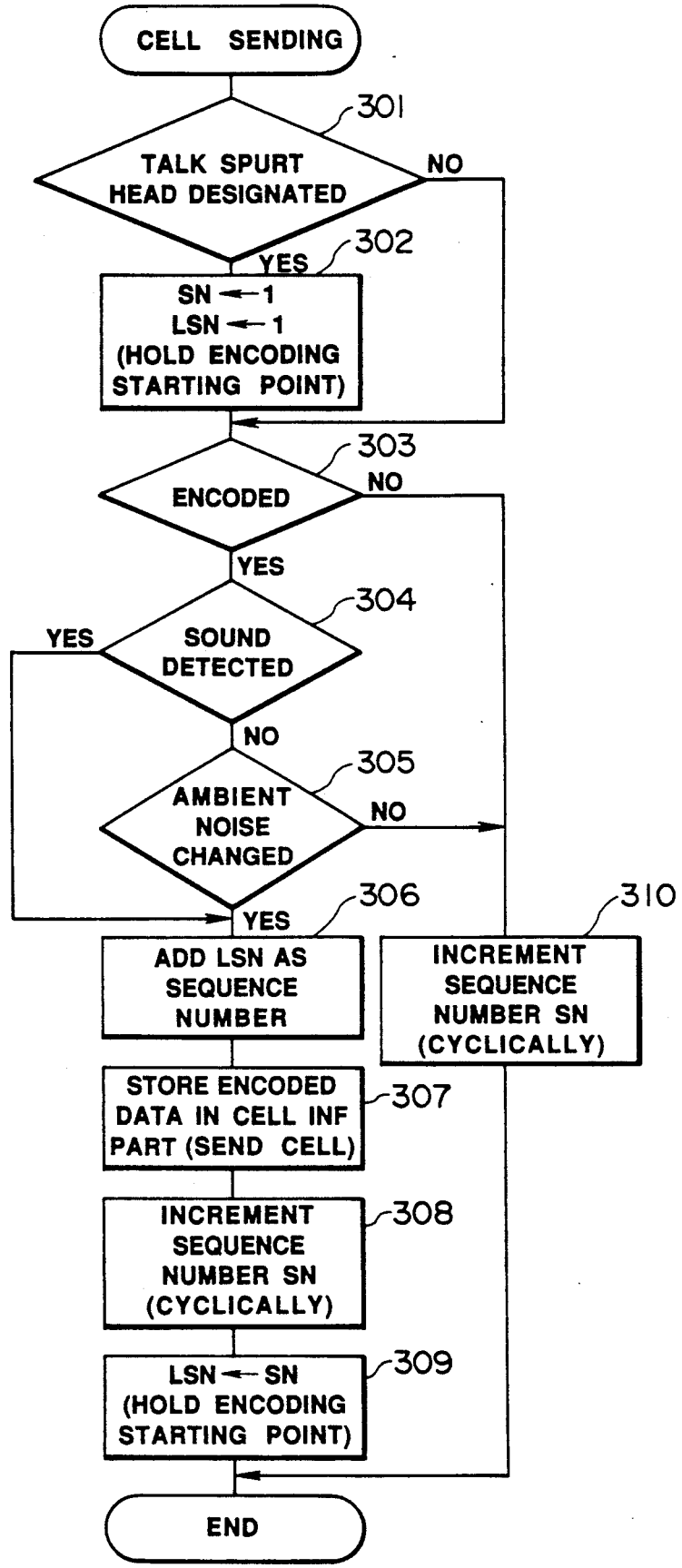
FIGS. 4 and 5 each are a flowchart indicative of the operation of the embodiment.
Figure 5:
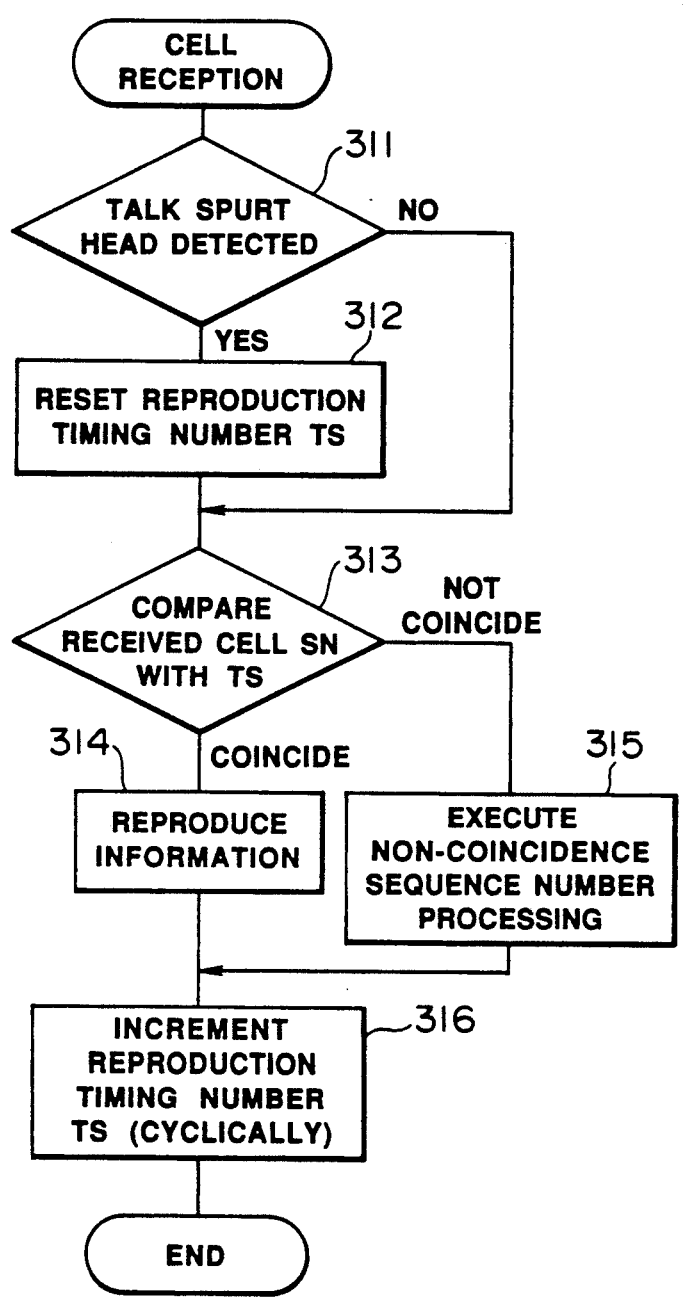

The cell transmission and reception by the cell converter 105 will be described with reference to the flowcharts on FIGS. 4 and 5, respectively, the flows of which are started periodically at intervals of the minimum unit encoding time t.

First, the operation of the cell transmission side will be described with reference to FIG. 4. When the controller 103 detects the head of a talk spurt (significant information) on the basis of a signal indicative of the sound/silence detection status d from the sound/silence detector 101, the controller 103 designates the head of the talk spurt to the cell converter 105 (step 301). Thus, the cell converter 105 sets at "1" each of a sequence number SN of the received cell and a sequence number LSN indicative of the starting point of encoding (step 302), respectively.

It is then checked whether encoding has ended or not in the encoder 104 (step 303). If the encoding has not ended, the sequence number SN is incremented by "1" (step 310) and the flow is ended.

When a time t has passed and this flow restarts again, the answer at step 301 is No since the head of the talk spurt has already passed and it is then checked whether encoding has ended or not (step 303).

If it is determined that the encoding has ended at step 303, it is checked whether the detected encoded information is sound-present or not in accordance with information from the controller 103 on the basis of the sound/silence detection status d (step 304). If the sound is present, the current number LSN is added to the cell as the sequence number (step 306), and the data encoded by the encoder 104 is stored in a cell information unit (not shown) of the cell converter 105 and this cell transfer is con trolled (step 307). Subsequently, the sequence number SN is incremented by "1" (step 308). This sequence number SN is set as the sequence number LSN at the starting point of the next encoding (step 309) and this flow is ended.

If it is determined at step 304 that the encoded information is silent, it is then checked whether there is a change in the ambient noise in accordance with the information from the controller 103 on the basis of the ambient noise change status e from the sound/silence detector 101 (step 305). If there is a significant change in the ambient noise, the ambient noise information is cellulated and sent to the reproduction side because it is required for interpolation of information in the reproduction side. Namely, the number LSN is given as the sequence number to the cell of encoded ambient noise information (step 306), the data encoded by the encoder 104 is stored in the cell information unit of the cell converter 105 and the cell is then sent (step 307). Subsequently, the sequence number SN is incremented by "1" (step 308). The sequence number SN is set as the sequence number LSN at the starting point of the next encoding operation (step 309) and the flow is ended.

If it is determined at step 305 that there is no change in the ambient noise, no ambient noise information is cellulated and sent. Thus, control passes to step 310 where the sequence number SN is incremented by "1" and the flow is ended.

In this way, the sequence number SN is cyclically incremented until the encoding ends. If the encoding ends, and the encoded information is sound-present or the encoded information is silent and there is a change in the ambient noise, a cell is sent which is given as the sequence number the number LSN held as the sequence number at the starting point of encoding. Therefore, the respective cells are given sequence numbers which become non-continuous in accordance with the needs for which weights corresponding to the encoded times have been added.

The operation of the cell receiving side will be described with reference to FIG. 5. When the cell converter 105 detects the head of a talk spurt from a signal on the high speed bus 17 (step 311), it resets the reproduction timing number TS (step 312). The reproduction timing number TS is a numerical information which is sequentially counted out at the same period as the minimum unit encoding time t used in the cell transmission side.

The sequence number SN of the subsequently received cell is compared with the reproduction timing number TS (step 313). If the number SN does not coincide with TS, a predetermined non-coincidence sequence number processing operation is executed (step 315). Subsequently, the reproduction timing number TS is incremented by "1" (step 316) and the flow is ended.

When a time t has passed and this flow restarts, the head of the talk spurt is not detected, so that the answer at step 311 is No, and the sequence number SN of the received cell is again compared with the reproduction timing number TS (step 313).

If the sequence number SN and the reproduction timing number TS coincide, reproduction of this cell is executed (step 314), the reproduction timing number TS is then incremented by "1" (step 316) and the flow is ended.

As described above, when the sequence number SN coincides with the reproduction timing number TS in the cell reception side, the reproduction of this cell is executed in which case no decoding time is required to be recognized in he cell reception side.

While in the above embodiment the sequence number including a weight corresponding to the encoding time of information of each cell is arranged to be given to the header of each cell, however, information indicative of the encoding time of information of each cell may be further given to the header of each cell in addition to the sequence number.

Figure 6:
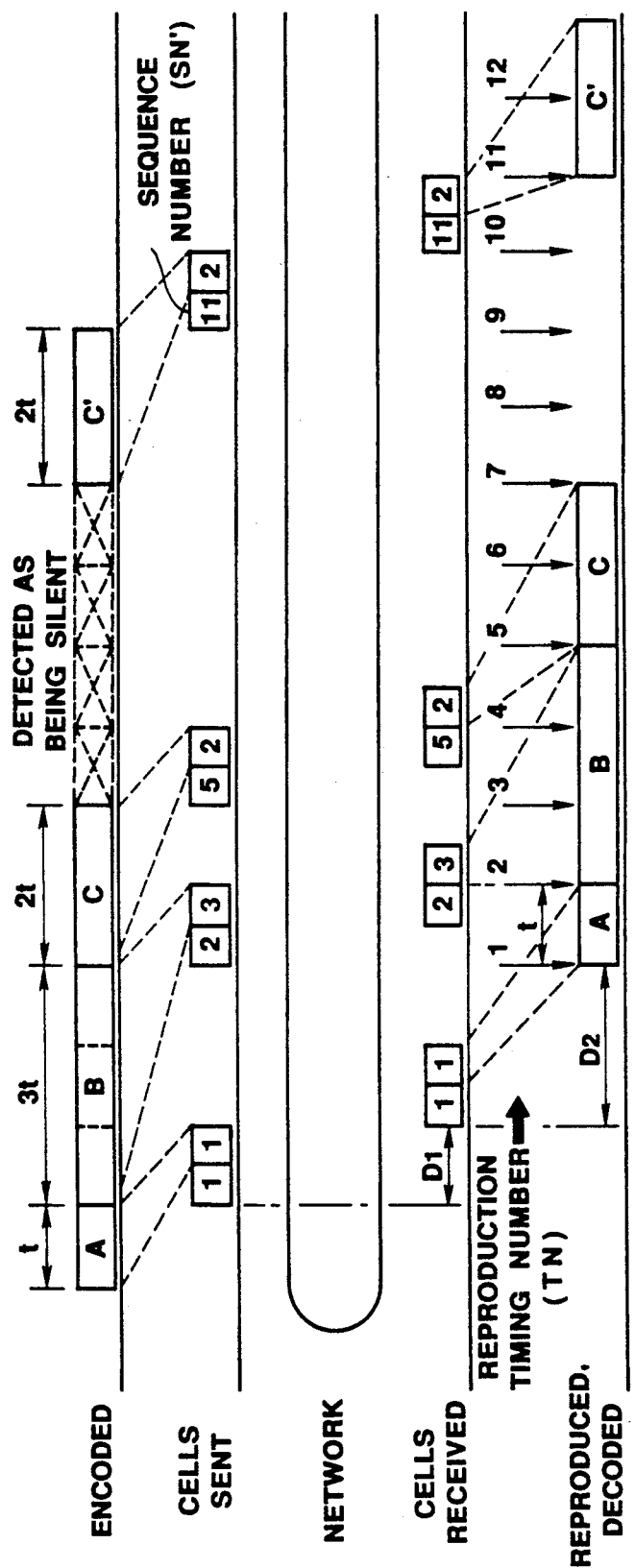
FIGS. 6, 7 and 8 each are a timing chart indicative of the operation of another embodiment of the present invention.

FIG. 6 is another embodiment of the present invention which realizes to such concept. In FIG. 6, only the header of each cell is shown. In FIG. 6, an encoded frame designated A is encoded in the minimum unit encoding time t, an encoded frame designated B is encoded in an encoding time 3t which is three times the minimum unit encoding time t, and an encoded frame designated C is encoded in an encoding time 2t which is twice the minimum unit encoding time t Therefore, when the encoded frame A is cellulated and sent, the sequence number "1" is set in the resulting cell and "1" indicating that the encoding time of the encoded frame A is the minimum unit encoding time t is also given to that cell.

For the cellulation of the encoded frame B occurring next, the sum "2" of the last sequence number "1" and the weighting number "1" corresponding to the fact that the encoded time of the encoded frame A last occurred is the minimum unit encoding time t is set as the sequence number of the cell corresponding to the encoded frame B. In addition, "3" indicating that the encoding time of the encoded frame B is 3t which is three times the minimum unit encoding time t is added.

For the cellulation of the encoded frame C occurring next, the sum "5" of the last sequence number "2" and the weighting number "3" corresponding to the fact that the encoding time of the encoded frame B last occurred is 3t is set as the sequence number of the cell corresponding to the encoded frame C. In addition, "2" indicating that the encoding time of the encoded frame C is 2t which is twice the minimum unit encoding time t is added to that cell.

The sequence number of the cell corresponding to the encoded frame C' occurring subsequent to the silent portion is set as "11" which comprises the sum of the last sequence number "5" and the weighting number "2" of the last cell and a weighting number "4" corresponding to the time 4t of the silent portion. In addition, "2" indicating that the encoding time of the encoded frame C' is 2t which is twice the minimum encoding time t is added to that cell.

By such construction, the receiving side is able to know the encoding times of the received cells to thereby facilitate the decoding operation by the decoder 106.

The respective cells sent by the transmission side may be given serial numbers in addition to their sequence numbers.

Figure 7:
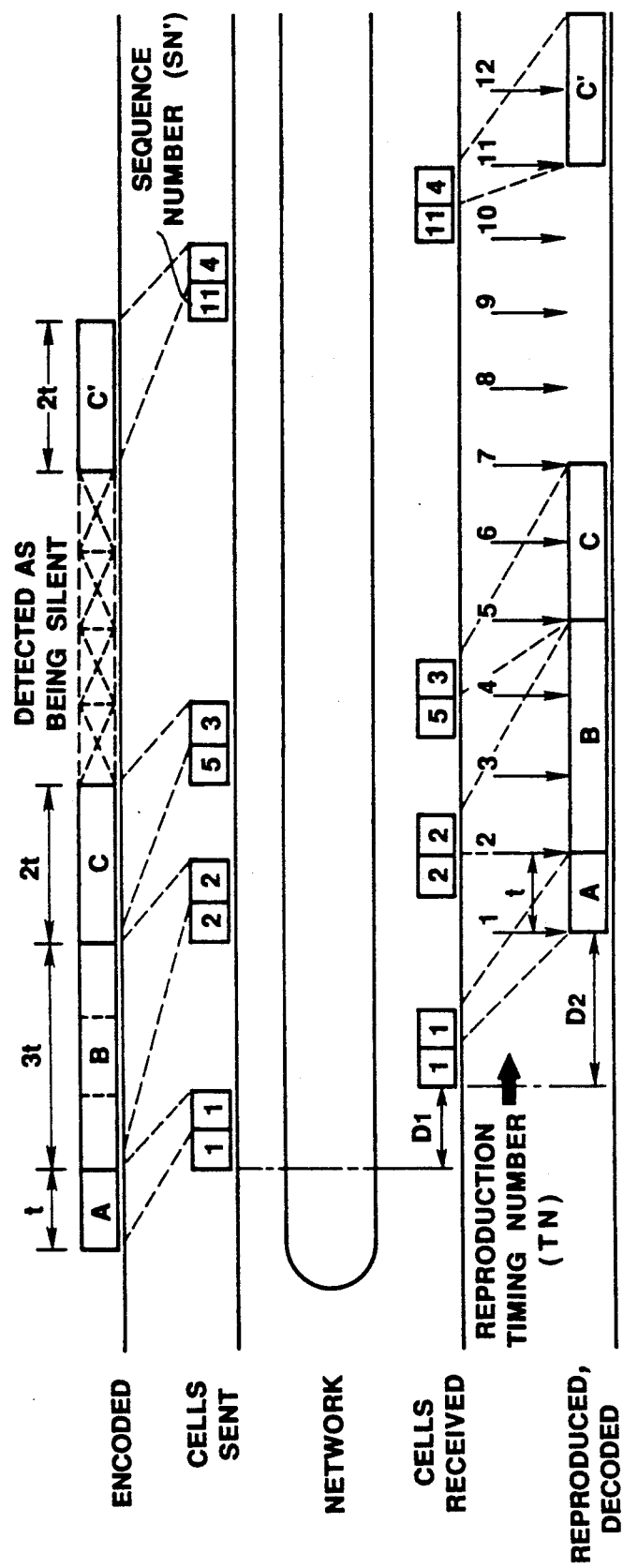

FIG. 7 shows another embodiment of the present invention which realizes such concept. By giving serial numbers to each cell, the receiving side is able to securely know a missing cell, if any, to thereby facilitate interpolation in the interpolator 107.

Figure 8:
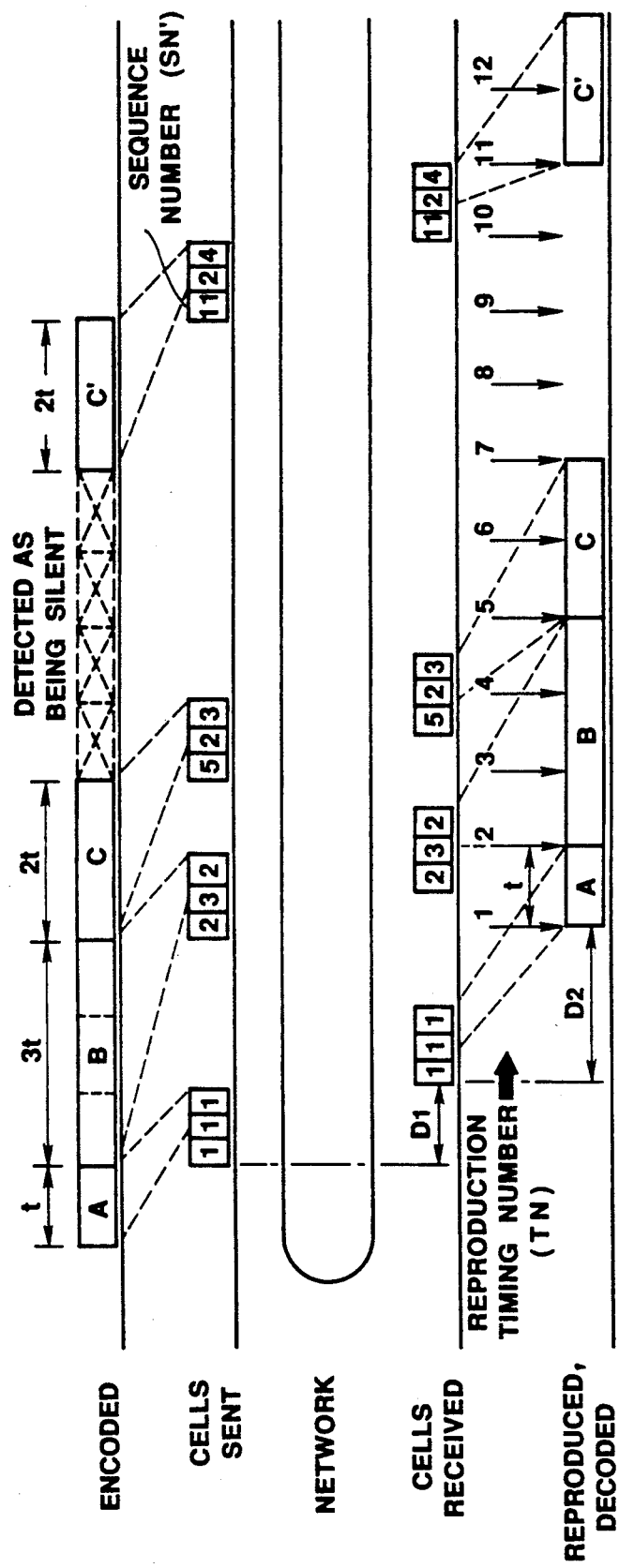
Figure 9:
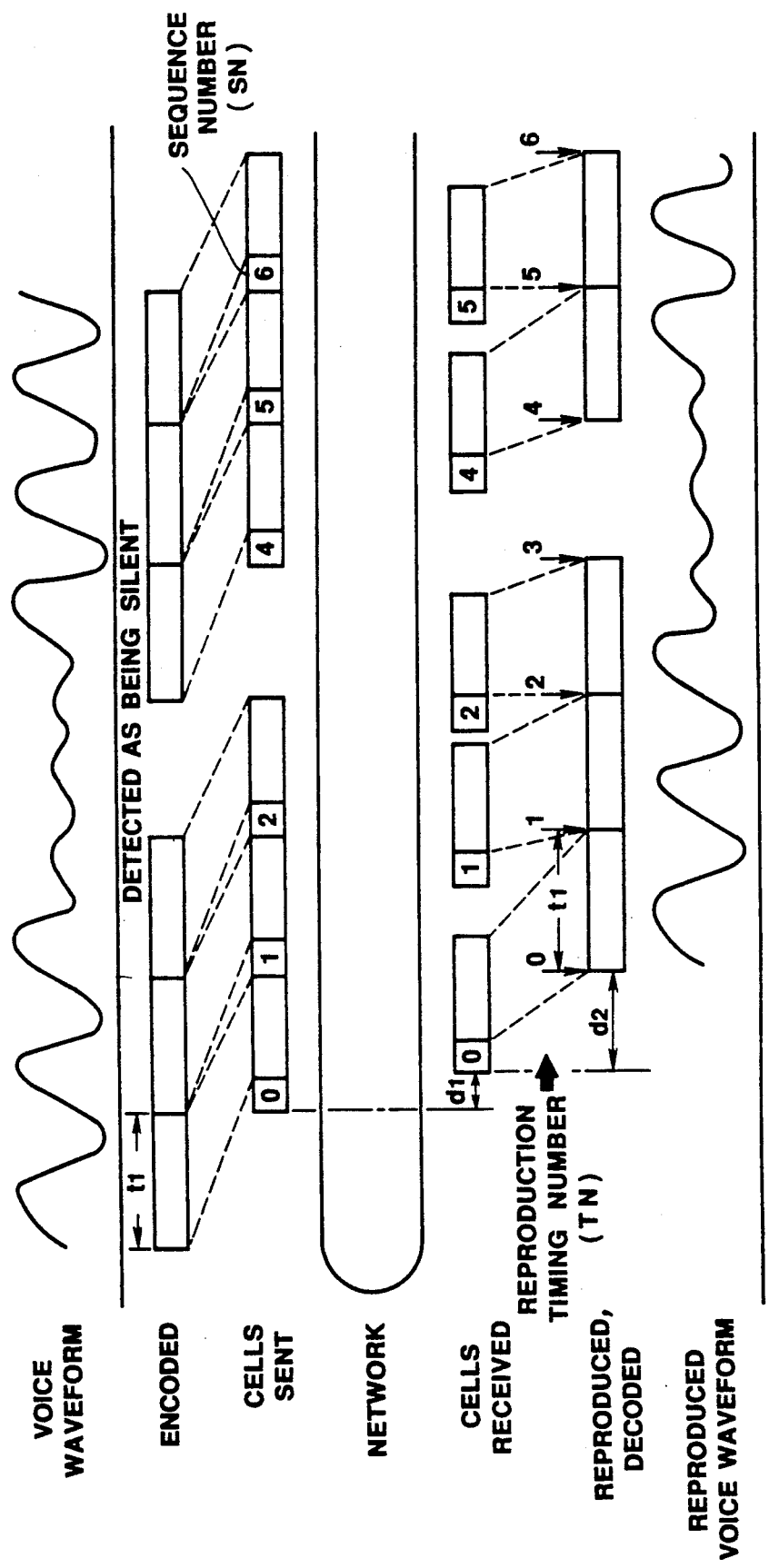
FIG. 9 is a timing chart indicative of a conventional cell transfer system.
Figure 10:
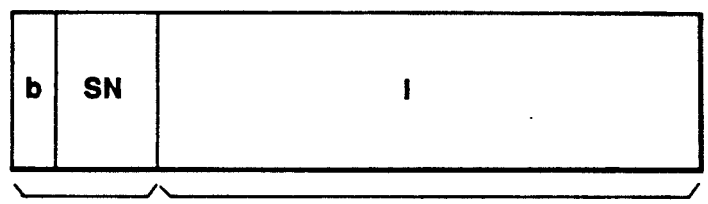
FIG. 10 shows an example of a format of cellulated information.

As shown further in FIG. 8, the respective cells may have both pieces of information indicative of their encoding times and serial numbers in addition to the sequence numbers of the cells transmitted by the transmitting side. In this case, since the receiving side is able to know the encoding time of a received cell, decoding by the decoder 106 is facilitated and a missing cell, if any, is recognized surely to thereby facilitate interpolation in the interpolator 107.

What is claimed is:

1. A cell transfer apparatus using a variable rate codec, comprising:
   variable rate encoding means for encoding a series of encoded information at different rates in correspondence with an amount of each unit of the information;
   cellulating means for sequentially cellulating each unit of encoding information encoded by the variable rate encoding means to cells having a fixed length;
   sequence number adding means for determining a sequence number of a cell corresponding to a present unit of encoding information by adding to a sequence number of a cell corresponding to a last unit of encoding information a weight corresponding to an encoding time of the last unit of encoding information by the variable rate encoding means, and sequentially adding to corresponding ones of the cells cellulated by the cellulating means thus determined respective sequence numbers; and
   cell sending means for asynchronously sending the cells cellulated by the cellulating means and having the sequence numbers added by the sequence number adding means.

2. A cell transfer apparatus according to claim 1, wherein the variable rate encoding means encodes high density information at a high encoding rate and low density information at a low encoding rate.

3. A cell transfer apparatus according to claim 1, wherein the sequence number adding means comprises:
   sequence number generating means for sequentially generating sequence numbers comprising serial numbers at a predetermined period;
   detecting means for detecting completion of encoding of a unit of encoding information by the variable rate encoding means;
   holding means for holding as a sequence number of an encoding starting point of a next unit of encoding information a value obtained by adding 1 to a sequence number being generated from the sequence number generating means at the time when the completion of encoding of the unit of encoding information is detected by the detecting means; and
   supplement means for adding the sequence number held in the holding means to the cell corresponding to the next unit of encoding information cellulated by the cellulating means.

4. A cell transfer apparatus according to claim 3, wherein the series of information comprises voice information, and wherein when sound is present or a change in an ambient noise is present, the holding means holds as the sequence number of the encoding starting point of the next unit of encoding information the value obtained by adding 1 to the sequence number being generated from the sequence number generating means at the time when the completion of encoding of the unit of encoding information is detected by the detecting means and, also when the sound is present or in the change in the ambient noise is present, the supplement means adds the sequence number held in the holding means to the cell corresponding to the next unit of encoding information.

5. A cell transfer apparatus using a variable rate codec, comprising:
   variable rate encoding means for encoding a series of information at different rates in correspondence with an amount of each unit of the information;
   cell converting means for adding a weight corresponding to an encoding time of a last unit of encoding information by the variable rate encoding means to a sequence number given to a cell corresponding to the last unit of encoding information to determine a sequence number of a cell corresponding to a present unit of encoding information, including the thus determined sequence number to the cell corresponding to the present unit of encoding information, and sequentially cellulating the unit of encoding information encoded by the variable rate encoding means to cells having a fixed length;
   cell sending means for asynchronously sending the cells cellulated by the cell converting means; and
   reproduction means, when receiving the cells sent from the cell sending means, for determining reproduction timings in accordance with the respective sequence numbers given to the cells.

6. A cell transfer apparatus according to claim 5, wherein the reproduction means comprises:
   means for sequentially generating reproduction timing numbers comprising serial numbers at a predetermined period;
   means for comparing a reproduction timing number generated by the generating means with a sequence number given to each cell; and
   means for decoding the information of a cell at a timing when the reproduction timing number and the sequence number of the cell coincide in the comparing means.

7. A cell transfer apparatus using a variable rate codec, comprising:
   variable rate encoding means for encoding a series of information at different rates in correspondence with an amount of each unit of the information;
   cellulating means for sequentially cellulating each unit of encoding information encoded by the encoding means to cells having a fixed length;
   sequence number generating means for sequentially generating sequence numbers comprising serial numbers at a predetermined period;
   detecting means for detecting completion of encoding of the unit of encoding information by the variable rate encoding means;
   holding means for holding as a sequence number of an encoding starting point of a next unit of encoding information a value obtained by adding 1 to a sequence number being generated from the sequence number generating means at the time when the completion of encoding of the unit of encoding information is detected by the detecting means;

means for sequentially adding the sequence number held in the holding means to the cell corresponding to the next unit of encoding information cellulated by the cellulating means;

cell sending means for asynchronously sending the cells cellulated by the cellulating means and having the sequence numbers added by the sequence number adding means; and reproduction means, when receiving the cells sent from the cell sending means, for determining reproduction timings in accordance with the respective sequence numbers.

8. A cell transfer apparatus according to claim 7, wherein the reproduction means comprises:

means for sequentially generating reproduction timing numbers of serial numbers at a predetermined period;

means for comparing a reproduction timing number generated by the reproduction timing number generating means with a sequence number added to each cell; and means for decoding the information of a cell at a timing when the reproduction timing number and the sequence number of the cell coincide in the comparing means.

9. A cell transfer apparatus using a variable rate codec, comprising:

variable rate encoding means for encoding a series of information at different rates in correspondence with an amount of each unit of the information;

cellulating means for sequentially cellulating each of unit of encoding information encoded by the variable rate encoding means to cells having a fixed length;

sequence number adding means for adding to a sequence number included in a cell corresponding to a last unit of encoding information a weight corresponding to an encoding time of the last unit of encoding information by the variable rate encoding means to determine a sequence number of a cell corresponding to a present unit of encoding information and sequentially adding thus determined sequence numbers to the cells cellulated by the cellulating means;

encoding time information adding means for adding to the cells cellulated by the cellulating means, encoding time information corresponding to respective encoding times of each unit of the information in the encoding means; and cell sending means for asynchronously sending the cells cellulated by the cellulating means, the cells having the sequence numbers added by the sequence number adding means and having the encoding time information added by the encoding time information adding means.

10. A cell transfer apparatus using a variable rate codec, comprising:

variable rate encoding means for encoding a series of information at different rates in correspondence with an amount of each unit of the information;

cellulating means for sequentially cellulating each of unit of encoding information encoded by the variable rate encoding means to cells of a fixed length;

sequence number adding means for adding to a sequence number of a cell corresponding to a last unit of encoding information a weight corresponding to an encoding time of the last unit of encoding information by the variable rate encoding means to determine a sequence number of a cell corresponding to a present unit of encoding information and sequentially adding thus determined sequence numbers to corresponding ones of cells cellulated by the cellulating means;

serial number adding means for adding serial numbers to the cells cellulated by the cellulating means; and cell sending means for asynchronously sending the cells cellulated by the cellulating means, the cells having the sequence numbers added by the sequence number adding means and having the serial numbers added by the serial number adding means.

11. A cell transfer apparatus using a variable rate codec, comprising:

variable rate encoding means for encoding a series of information at different rates in correspondence with an amount of each unit of the information;

cellulating means for sequentially cellulating each unit of encoding information encoded by the variable rate encoding means to cells having a fixed length;

sequence number adding means for adding to a sequence number of a cell corresponding to a last unit of encoding information a weight corresponding to an encoding time of the last unit of encoding information by the variable rate encoding means to determine a sequence number of a cell corresponding to a present unit of encoding information and sequentially adding thus determined sequence numbers to corresponding ones of cells cellulated by the cellulating means;

encoding time information adding means for adding to the cells cellulated by the cellulating means, encoding time information corresponding to respective encoding times of each unit of the information in the encoding means;

serial number adding means for adding serial numbers to the cells cellulated by the cellulating means; and cell sending means for asynchronously sending the cells cellulated by the cellulating means, the cells having the sequence numbers added by the sequence number adding means, having the encoding time information added by the encoding time information adding means and having the serial numbers added by the serial number adding means.

12. A cell transfer method using a variable rate codec in which information is encoded at a variable rate by the variable rate codec, and the encoded information is cellulated to packets having a fixed length and transferred in an asynchronous manner, comprising the steps of:

determining a sequence number of a cell corresponding to a present unit of encoding information by adding to a sequence number of a cell corresponding to a last unit of encoding information a weight corresponding to an encoding time of the last unit of encoding information when the cellulated information is to be sent; and determining a reproduction timing in accordance with the sequence number of the cellulated information being received when same is to be reproduced.

13. A cell transfer method using a variable rate codec in which information is encoded at a variable rate by the variable rate codec, and the encoded information is cellulated to packets having a fixed length and transferred in an asynchronous manner, comprising the steps of:

encoding a series of information at different rates in correspondence with an amount of each of pieces of the information;

cellulating each unit of encoding information to cells having a predetermined fixed length;

determining as a sequence number of a cell corresponding to a present unit of encoding information by adding to a sequence number of a cell corresponding to a last unit of encoding information a weight corresponding to an encoding time of the last unit of encoding information, and adding a thus determined sequence number to corresponding ones of said cells;

sequentially generating reproduction timing numbers comprising serial numbers at a predetermined period;

comparing the reproduction timing numbers with the sequence numbers added to the respective cells; and decoding the information of a cell at a timing when the reproduction timing number coincides with the sequence number of the cell.

14. A cell transfer method using a variable rate codec in which information is encoded at a variable rate by the variable rate codec, and the encoded information is cellulated to packets having a fixed length and transferred in an asynchronous manner, comprising the steps of:

determining a sequence number of a cell corresponding to a present unit of encoding information by adding to a sequence number added to a cell corresponding to a last unit of encoding information a weight corresponding to an encoding time of the last unit of encoding information, and adding to corresponding ones of said cells a thus determined sequence number together with encoding time information indicative of the encoding time of each cell when the cellulated information is to be sent, and sending the resulting cells; and determining a reproduction timing in accordance with the sequence number of the cellulated information being received when the cellulated information is to be reproduced.

15. A cell transfer method using a variable rate codec in which information is encoded at a variable rate by the variable rate codec, and the encoded information is cellulated to packets having a fixed length and transferred in an asynchronous manner, comprising the steps of:

determining, when the cellulated information is sent, a sequence number of a cell corresponding to a present unit of encoding information by adding to a sequence number of a cell corresponding to a last unit of encoding information a weight corresponding to an encoding time of the last unit of encoding information, adding to corresponding ones of said cells a thus determined sequence number together with a serial number indicative of the order of each cell, and sending the resulting cells; and determining, when a received cellulated information is reproduced, a reproduction timing in accordance with the sequence number of the received cell.

16. A cell transfer method using a variable rate codec in which information is encoded at a variable rate by the variable rate codec, and the encoded information is cellulated to packets having a fixed length and transferred in an asynchronous manner, comprising the steps of:

determining, when the cellulated information is sent, a sequence number of a cell corresponding to a present unit of encoding information by adding to a sequence number of a cell corresponding to a last unit of encoding information a weight corresponding to an encoding time of the last unit of encoding information, adding to each cell a thus determined sequence number together with encoding time information and a serial number indicative of the order of each cell, and sending the resulting cells; and determining a reproduction timing in accordance with the sequence number of a received cellulated information when the received cellulated information is reproduced.

* * * * *